US005742401A

United States Patent [19]

[11] Patent Number: 5,742,401

[45] Date of Patent: Apr. 21, 1998

Bringley et al.

[54] LASER-EXPOSED THERMAL RECORDING ELEMENT

[75] Inventors: Joseph F. Bringley; Kurt D. Sieber; David P. Trauernicht, all of Rochester, N.Y.

[73] Assignee: Eastman Kodak Company, Rochester, N.Y.

[21] Appl. No.: 769,336

[22] Filed: Dec. 19, 1996

[51] Int. Cl.$^6$ .................. H04N 1/23; H04N 1/40; G01D 9/00; G01D 9/42

[52] U.S. Cl. .................. 358/297; 358/298; 346/135.1; 347/215; 347/262

[58] Field of Search .................. 358/296–298, 358/456; 346/135.1; 347/215, 221, 262, 264; 428/195, 204, 206, 411.1, 457, 469–472, 472.1

[56] References Cited

U.S. PATENT DOCUMENTS

| | | | |
|---|---|---|---|
| 4,415,650 | 11/1983 | Kido et al. | 428/457 |
| 4,587,198 | 5/1986 | Fisch | 346/135.1 |
| 4,599,298 | 7/1986 | Fisch | 346/135.1 |
| 4,621,271 | 11/1986 | Brownstein . | |
| 4,628,541 | 12/1986 | Beavers . | |
| 5,168,288 | 12/1992 | Baek et al. | 347/262 |
| 5,326,619 | 7/1994 | Dower et al. | 428/195 |
| 5,400,147 | 3/1995 | Korn et al. | 358/297 |
| 5,447,767 | 9/1995 | Tanabe et al. | 428/457 |
| 5,459,016 | 10/1995 | Debe et al. | 428/195 |
| 5,503,956 | 4/1996 | Kaszczuk et al. . | |

*Primary Examiner*—Eric Frahm
*Attorney, Agent, or Firm*—Harold E. Cole

[57] ABSTRACT

A laser-exposed thermal recording element comprising a flexible support having thereon the following imaging layers in sequence:

a) an electrically conductive layer, and b) an electro-deposited black layer, with the proviso that the sum of the optical densities of layers a) and b) is between about 0.5 and about 5.

20 Claims, No Drawings

LASER-EXPOSED THERMAL RECORDING ELEMENT

This invention relates to laser-exposed thermal recording elements, and more particularly to such elements which are used in medical imaging.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to one of the cyan, magenta or yellow signals. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB 2,083,726A, the disclosure of which is hereby incorporated by reference.

In one ablative mode of imaging by the action of a laser beam, an element with a dye layer composition comprising an image dye, an infrared-absorbing material, and a binder coated onto a substrate is imaged from the dye side. The energy provided by the laser drives off at least the image dye at the spot where the laser beam impinges upon the element. In ablative imaging, the laser radiation causes rapid local changes in the imaging layer thereby causing the material to be ejected from the layer. This is distinguishable from other material transfer techniques in that some sort of chemical change (e.g., bond-breaking), rather than a completely physical change (e.g., melting, evaporation or sublimation), causes an almost complete transfer of the image dye rather than a partial transfer. Usefulness of such an ablative element is largely determined by the efficiency at which the imaging dye can be removed on laser exposure. The transmission Dmin value is a quantitative measure of dye clean-out: the lower its value at the recording spot, the more complete is the attained dye removal.

Laser ablative imaging is of interest for medical applications since the advent of digital imaging techniques and because conventional silver halide film is costly and has undesirable waste products. Medical imaging films should have an optical density in the visible region between about 0.1 and 4.0. The accurate reproduction of film-based images or the production of digitally-captured diagnostic images is dependent upon the ability of the techniques employed to faithfully reproduce the gray level gradation between the black and white extremes in the radiographic image. Laser ablative medical imaging is limited by the fact that only a small number of gray-scale steps are accessible in this technique, thus making it difficult to adequately reproduce a continuous tone image. A further problem associated with laser dye media is that the dyes used in ablative media may have poor lightbox stability, thus limiting the lifetime of the image.

U.S. Pat. No. 5,400,147 relates to a method of half-tone image reproduction of images in which a transparent support is coated on each side with an ablative dye coating. The respective dye coatings may have the same or different optical densities. A scanning beam of ablative radiation is then intensity-modulated to ablate or leave intact the ablative dye coating on one side. The above scanning steps are then repeated to ablate or leave intact the ablative dye layer on the other side. In this manner, different gray-scale steps may be obtained: where the ablative layer on each side is intact, where only one of the layers is ablated while the other layer is intact, and where both layers are ablated.

While this method provides greater gray-scale flexibility, the method is limited in several ways. It is limited to a transparent support and thus only back-lit images may be viewed. In addition, the support must be coated on both sides and is thus difficult and expensive to manufacture. Further, the ablation is performed in sequential scans which is time-consuming, limiting the through-put of the system and the number of gray-scale steps to four.

It is an object of this invention to provide a laser-imageable material with an improved lightbox stability. It is another object of the invention to provide a laser-imageable material which is coated in sequential layers on a single side of an opaque or transparent support which can be ablated with intensity-modulated radiation to produce three or more gray-scale steps in a single scan.

These and other objects are achieved in accordance with this invention which relates to a laser-exposed thermal recording element comprising a flexible support having thereon the following imaging layers in sequence:

a) an electrically conductive layer, and b) an electro-deposited black layer, with the proviso that the sum of the optical densities of layers a) and b) is between about 0.5 and about 5.

In a preferred embodiment of the invention, the thickness of the conductive layer is from about 100 to about 1,000 Å, preferably from about 300 to about 1,000 Å. In another embodiment of the invention, the conductive layer is nickel or copper. In still another embodiment of the invention, the black layer is electro-deposited nickel sulfide or electro-deposited silver oxide.

Another embodiment of the invention relates to a laser-exposed thermal recording element comprising a flexible support having thereon the following imaging layers in sequence:

a) an electrically-conductive layer, b) a metal oxide or metal sulfide black layer, c) an electrically-conductive layer, and d) a metal oxide or metal sulfide black layer, with the proviso that the sum of the optical densities of layers a) through d) is between about 0.5 and about 5.

Still another embodiment of the invention relates to a process of forming a single color, ablation image comprising imagewise-exposing by means of a laser, in the absence of a separate receiving element, a laser-exposed thermal recording element as described above, thereby imagewise-heating the imaging layer or layers and causing it or them to ablate, and removing the ablated material to obtain an image in the laser-exposed thermal recording element.

The recording elements of this invention can be used to obtain medical images, reprographic masks, printing masks, etc. The image obtained can be a positive or a negative image. The process of the invention can generate halftone images.

The invention is especially useful in making high quality reproductions of film radiographs or for the production of digitally-captured diagnostic images. The accurate reproduction of copies of a film-based image or the quality of digitally-generated images is dependent upon the ability of the medium and technique to faithfully reproduce the gray-level gradation between the black and white extremes in the original image. The recording element of the invention which contains no binder or light-sensitive dyes, can be mounted on a rotating drum and scanned with a beam of ablative radiation which is intensity-modulated in correspondence with the film-based or digitally-detected image. The ablative radiation-absorbing layers can be ablated sequentially or all at once depending upon the radiation intensity to provide an image with three or more gray-scale steps in a single scanning sequence.

The invention also is useful in making reprographic masks which are used in publishing and in the generation of printed circuit boards. The masks are placed over a photosensitive material, such as a printing plate, and exposed to a light source. The photosensitive material usually is activated only by certain wavelengths. For example, the photosensitive material can be a polymer which is crosslinked or hardened upon exposure to ultraviolet or blue light, but is not affected by red or green light. For these photosensitive materials, the mask, which is used to block light during exposure, must absorb all wavelengths which activate the photosensitive material in the Dmax regions and absorb little in the Dmin regions. For printing plates, it is therefore important that the mask have high blue and UV Dmax. If it does not do this, the printing plate would not be developable to give regions which take up ink and regions which do not.

By use of this invention, a mask can be obtained which has enhanced stability to light for making multiple printing plates or circuit boards without mask degradation.

To obtain a laser-induced image according to the invention, an infrared diode laser is preferably employed since it offers substantial advantages in terms of its small size, low cost, stability, reliability, ruggedness, and ease of modulation.

Lasers which can be used in the invention are available commercially. There can be employed, for example, Laser Model SDL-2420-H2 from Spectra Diode Labs, or Laser Model SLD 304 V/W from Sony Corp.

Any material can be used as the support for the recording element of the invention provided it is a flexible, dimensionally stable and .can withstand the heat of the laser. Such materials include polyesters such as poly(ethylene naphthalate); polysulfones; poly(ethylene terephthalate); polyamides; polycarbonates; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; flexible metal sheets (which may also function additionally as the electrically conductive layer) such as aluminum, copper, tin, etc.; and polyimides such as polyimide-amides and polyether-imides. The support generally has a thickness of from about 5 to about 200 μm.

The electrically conductive layer employed in the invention may be any metal or electrical conductor upon which it is possible to electro-deposit subsequent layers. Such electrically conductive layers may include metals, conducting metal-oxide or metal-chalcogenide layers, and conducting organic layers such as conducting polymers. Examples of suitable materials for the electrically conductive layer include titanium, chromium, iron, cobalt, nickel, copper, zinc, aluminum, tin, molybdenum, palladium, gold, silver, cadmium, tantalum, bismuth, tin oxide, indium tin oxide, doped-antimony oxide, polyaniline, doped polyacetylene, polyphenylsulfide, etc. This layer may be applied to the support by any means in which it is possible to obtain a uniform thin film conducting layer having a thickness of between about 5 nm–300 nm, and an optical density in the visible spectrum of about 0.1–2.5. Suitable methods of deposition include chemical vapor deposition, vacuum deposition methods such as physical vapor deposition, electron beam deposition, magnetron sputtering, molecular beam epitaxy, and solvent or web coating.

The black layer employed in the invention may consist of any material which can be uniformly deposited unto a conducting support such as by means of electro-deposition or any of the means discussed above, and which provides a layer which is optically black and has an optical density between 0.1 and 4.0. In a preferred embodiment of the invention, the black layer, or the sum total of its combination with other layers, should have a neutral tone or a slightly "cold" tone consisting of slightly higher optical absorption in the red (600–700 nm) region of the visible spectrum. Preferred materials for use in the black layer are nickel sulfide, silver oxide, copper oxide, tin(II) oxide, black chrome, platinum black and polyaniline, and alloys of the above. Other materials such as electrically-conducting polymers and electro-deposited polymers, of which polyacetylene and polyaniline are examples, may be suitable for the black layer. In some cases, it may be desirable to employ as one of the black layers, a mixture of laser-absorbing dyes contained in a polymer matrix. Mixtures of dyes suitable for such purposes are described in U.S. Pat. No. 5,503,956, the disclosure of which is hereby incorporated by reference.

In some cases, the above layers may be overcoated with a protective coating such as is disclosed in U.S. Pat. No. 4,628,541.

A thermal printer which uses a laser as described above to form an image on a thermal print medium is described and claimed in U.S. Pat. No. 5,168,288, the disclosure of which is hereby incorporated by reference.

The following examples are provided to illustrate the invention.

PRINTING

Coatings were evaluated on a dram scanner system consisting of a 12.75 cm drum~10 cm long. The samples were mounted on the outside surface of the drum. The rotational speed of the drum could be varied from a speed of 1 to 800 rev/min. An 827 nm diode laser was aimed perpendicular to the drum surface, and was focused to a 6 μm by 8 μm $1/e^2$ full width spot at the sample surface. The laser power could be varied from 0 to 100 mW. The pitch of the scan was 5 μm for all rotational speeds. The focal position of the laser was adjusted to account for any variances in substrate thickness. Experiments were performed using controlled laser exposures, and the "writing" speed was determined by measuring the optical densities of the exposed and unexposed areas for various drum rotational speeds and laser powers.

Visible optical densities were measured on a transmission densitometer purchased from X-Rite, Inc., Grand Rapids, Mich.

EXAMPLE 1

An electrochemical bath for the deposition of nickel sulfide was prepared by dissolving 70.00 g $NiCl_2 6H_2O$, 20.0 g $NH_4Cl$, 20.0 g NaSCN and 30.00 g $ZnCl_2$ in 1.00 l of distilled $H_2O$. Nickel sulfide was then electro-deposited onto a subbed Estar® (Eastman Kodak Co.) substrate which had been previously coated with about 200 Å of Ni metal by electron-beam evaporation. The substrate was placed at the cathode and a steel wire mesh was employed as the anode. Power was supplied by a D.C. power supply (HBS Equipment Corp.) and the cell was operated at 1.5 V with a measured current of about 120 mA. The original optical density of the substrate was 0.4 and the deposition was continued until a final optical density of 2.2 was achieved. This process provides a thin deep black nickel sulfide coating on the surface of the substrate. The coated layers could be completely ablated at the drum speed given in Table 1.

EXAMPLE 2

This example was the same as Example 1 except that the Estar® substrate was first coated with about 1500 Å of Cu having an optical density of about 2.5. The nickel sulfide coating was applied to a final optical density of about 3.5. The coated layers could be completely ablated at the drum speed given in Table 1.

EXAMPLE 3

An electrochemical bath for the deposition of silver oxide was prepared by dissolving 8.35 g of silver acetate in 1.00 l of distilled $H_2O$. Silver oxide was then coated onto a subbed Estar® substrate which had been previously coated with about 200 Å of Ni metal by electron-beam evaporation. The substrate was placed at the anode and a steel wire mesh was employed as the cathode. Power was supplied by a D.C. power supply (HBS Equipment Corp.) and the cell was operated at 1.0 V with a measured current of about 60 mA. The original optical density of the substrate was 0.4 and the deposition was continued until a final optical density of 2.5 was achieved. This process provides a thin deep black silver oxide coating on the surface of the electrically-conductive substrate. The coated layers could be completely ablated at the drum speed given in Table 1.

TABLE 1

| Example | Conductive Layer (Å) | Black Layer | Final O.D. | Printing Speed (rev/min) |
|---|---|---|---|---|
| E1 | Ni (200) | NiS | 2.2 | 800 |
| E2 | Cu (1500) | NiS | 3.5 | 600 |
| E3 | Ni (200) | AgO | 2.5 | 800 |

The above results show that the composition of the conductive layer, the black layer and the relative thicknesses of the respective layers can be varied widely to give an ablatable imaging media.

EXAMPLE 4

A conducting substrate was prepared by electron-beam deposition of about 330 Å of Ni onto unsubbed Estar® to give an optical density of 0.80. Nickel sulfide was then electro-deposited onto this substrate as in Example 1 to give a thin deep black coating with a final optical density of 2.0. Experiments were then performed to assess the printing speed for complete ablation of the deposited layers. The results are given in Table 2.

EXAMPLE 5

A conducting substrate was prepared by electron-beam deposition of about 660 Å of Ni onto unsubbed Estar® to give an optical density of 1.70. Nickel sulfide was then electro-deposited onto this substrate as in Example 1 to give a thin deep black coating with a final optical density of 2.0–2.10. Experiments were then performed to assess the printing speed for complete ablation of the deposited layers. The results are given in Table 2.

EXAMPLE 6

A conducting substrate was prepared by electron-beam deposition of about 1000 Å of Ni onto unsubbed Estar® to give an optical density of 2.20. Nickel sulfide was then electro-deposited onto this substrate as in Example 1 to give a thin deep black coating with a final optical density of 2.6. Experiments were then performed to assess the printing speed for complete ablation of the deposited layers. The results are given in Table 2.

TABLE 2

| Example | Nickel Thickness (Å) | Optical Density | Black Layer | Final O.D. | Printing Speed (rev/min) |
|---|---|---|---|---|---|
| E4 | 330 | 0.80 | NiS | 2.0 | 360 |
| E5 | 660 | 1.70 | NiS | 2.1 | 480 |
| E6 | 1000 | 2.20 | NiS | 2.6 | 600 |

The above results show that the printing speed of the ablative media increases as the thickness of the conductive metal layer increases.

EXAMPLE 7

In this experiment a coating prepared in an identical manner to that of Example 1 having an overall optical density of about 2.5 was subjected to exposure from actinic radiation from a lightbox (Picker Corp.) for five days. After this time period, the optical densities were measured and showed no change from initial values, indicating no degradation or bleaching due to the light exposure. This example demonstrates the extremely high image stability of the recording element of the present invention.

EXAMPLE 8

Using the procedure of Example 1, a coating of nickel sulfide was electrodeposited onto an Estar® substrate having a 200 Å coating of nickel to give an overall optical density of about 1.8. Onto this coating was then deposited by electron beam evaporation approximately 350 Å nickel to give an overall optical density of about 2.3. This procedure thus produced a multilayer printing medium having sequentially the following layers: support/Ni/NiS/Ni.

EXAMPLE 9

Onto a portion of the coating prepared in Example 8 was then applied a layer of nickel sulfide via electrodeposition to a final optical density of about 3.2. This procedure thus produced a multilayer printing medium having sequentially the following layers: support/Ni/NiS/Ni/NiS.

The optical density as a function of laser exposure of the recording elements from each of Examples 1, 8 and 9 was determined by mounting the samples onto a rotating drum and varying the exposure intensity of laser radiation to create a step wedge in each of the elements. The following results were obtained:

TABLE 3

| Example 1 | | Example 8 | | Example 9 | |
|---|---|---|---|---|---|
| Laser Power (mW) | O.D. | Laser Power (mW) | O.D. | Laser Power (mW) | O.D. |
| 20 | 2.30 | 20 | 2.20 | 20 | 3.06 |
| 32 | 2.30 | 24 | 2.15 | 24 | 3.04 |
| 40 | 1.85 | 34 | 2.10 | 34 | 3.11 |
| 50 | 1.61 | 43 | 2.10 | 43 | 2.85 |
| 63 | 0.14 | 53 | 1.81 | 48 | 2.65 |
| 79 | 0.05 | 62 | 1.17 | 53 | 2.05 |
| 100 | 0.05 | 72 | 0.66 | 58 | 1.90 |
| | | 82 | 0.37 | 62 | 1.95 |
| | | 91 | 0.21 | 67 | 1.95 |
| | | 100 | 0.17 | 72 | 1.55 |
| | | | | 82 | 0.46 |
| | | | | 92 | 0.30 |
| | | | | 100 | 0.20 |

The above results show that there is a relationship between laser power and optical density which can be controlled by varying the number and sequence of layers. In Example 9, a region exists in the laser power from 53 mW–67 mW in which the optical density does not change significantly with increasing laser power, but is intermediate between the optical densities measured after exposure to low laser power and high laser power, respectively.

Thus, the curve representing the relationship between optical density and laser power for this multilayer sample contains a plateau which can be utilized to provide a recording element with greater gray-scale definition and hence improved imaging properties. This behavior is due to the sequential ablation of Ni/NiS bilayers of the recording element. Thus it is possible to design a recording element containing multiple bilayers in which one or more plateau regions exist in the curve representing the relationship between optical density and laser power.

The invention has been described in detail with particular reference to preferred embodiments thereof, but it will be understood that variations and modifications can be effected within the spirit and scope of the invention.

What is claimed is:

1. A laser-exposed thermal recording element comprising a flexible support having thereon the following imaging layers in sequence:

a) an electrically conductive layer, and b) an electro-deposited black layer, with the proviso that the sum of the optical densities of layers a) and b) is between about 0.5 and about 5.

2. The element of claim 1 wherein the thickness of said conductive layer is from about 300 to about 1,000 Å.

3. The element of claim 1 wherein said conductive layer is nickel.

4. The element of claim 1 wherein said black layer is electro-deposited nickel sulfide.

5. The element of claim 1 wherein said black layer is electro-deposited silver oxide.

6. The element of claim 1 wherein said conductive layer is copper.

7. A process of forming a single color, ablation image comprising:

a) imagewise-exposing, by means of a laser, in the absence of a separate receiving element, the thermal recording element of claim 1, and b) removing the ablated material to obtain an image in said thermal recording element.

8. The process of claim 7 wherein the thickness of said conductive layer is from about 300 to about 1,000 Å.

9. The process of claim 7 wherein said conductive layer is nickel or copper.

10. The process of claim 7 wherein said black layer is electro-deposited nickel sulfide or electro-deposited silver oxide.

11. A laser-exposed thermal recording element comprising a flexible support having thereon the following imaging layers in sequence:

a) an electrically-conductive layer, b) a metal oxide or metal sulfide black layer, c) an electrically-conductive layer, and d) a metal oxide or metal sulfide black layer, with the proviso that the sum of the optical densities of layers a) through d) is between about 0.5 and about 5.

12. The element of claim 11 wherein the thickness of each said conductive layer is from about 300 to about 1,000 Å.

13. The element of claim 11 wherein said each conductive layer is nickel.

14. The element of claim 11 wherein each said black layer is electro-deposited nickel sulfide.

15. The element of claim 11 wherein one said black layer is electro-deposited silver oxide and the other said black layer is electro-deposited nickel sulfide.

16. The element of claim 11 wherein each said conductive layer is copper.

17. A process of forming a single color, ablation image comprising:

a) imagewise-exposing, by means of a laser, in the absence of a separate receiving element, the thermal recording element of claim 11, and b) removing the ablated material to obtain an image in said thermal recording element.

18. The process of claim 17 wherein the thickness of each said conductive layer is from about 100 to about 1,000 Å.

19. The process of claim 17 wherein each said conductive layer is nickel or copper.

20. The process of claim 17 wherein each said black layer is electro-deposited nickel sulfide or electro-deposited silver oxide.

* * * * *